(12) United States Patent
Lo et al.

(10) Patent No.: US 9,188,817 B2
(45) Date of Patent: Nov. 17, 2015

(54) PIXEL STRUCTURE

(71) Applicant: Shenzhen China Star Optoelectronics Technology Co., Ltd., Shenzhen, Guangdong (CN)

(72) Inventors: Shihhsun Lo, Guangdong (CN); Jinbo Guo, Guangdong (CN); Shishuai Huang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 75 days.

(21) Appl. No.: 14/356,222

(22) PCT Filed: Jan. 22, 2014

(86) PCT No.: PCT/CN2014/071159
§ 371 (c)(1),
(2) Date: May 5, 2014

(87) PCT Pub. No.: WO2015/096258
PCT Pub. Date: Jul. 2, 2015

(65) Prior Publication Data
US 2015/0286102 A1    Oct. 8, 2015

(30) Foreign Application Priority Data

Dec. 26, 2013  (CN) .......................... 2013 1 0733624

(51) Int. Cl.
*G02F 1/1343* (2006.01)
*G02F 1/1368* (2006.01)
(Continued)

(52) U.S. Cl.
CPC ........ *G02F 1/134309* (2013.01); *G02F 1/1368* (2013.01); *G02F 1/133514* (2013.01); *G02F 1/136213* (2013.01); *G02F 2001/134318* (2013.01); *G02F 2001/134345* (2013.01)

(58) Field of Classification Search
CPC .............. G02F 1/134345; G02F 2001/134318; G02F 2001/134381; G02F 1/134309; G02F 1/136213; G02F 1/1368; G02F 1/133514
See application file for complete search history.

(56) References Cited

U.S. PATENT DOCUMENTS

| | | | | |
|---|---|---|---|---|
| 8,643,802 B2* | 2/2014 | Ting | .................. | G02F 1/134336 349/144 |
| 2009/0046233 A1* | 2/2009 | Cho | .................. | G02F 1/133707 349/141 |

(Continued)

FOREIGN PATENT DOCUMENTS

| CN | 1601362 A | 3/2005 |
|---|---|---|
| CN | 101510414 A | 8/2009 |

(Continued)

*Primary Examiner* — Dennis Y Kim
(74) *Attorney, Agent, or Firm* — Andrew C. Cheng (57) ABSTRACT

The present invention provides a pixel structure, which includes a TFT substrate (20), a CF substrate (30) and a liquid crystal layer (40). The TFT substrate (20) includes a first transparent substrate (22) and a pixel electrode (24). The CF substrate (30) includes a second transparent substrate (32) and a common electrode (34). The pixel electrode (24) includes a first sub pixel electrode (26) and a second sub pixel electrode (28). The common electrode (34) includes a first sub common electrode (36) and a second sub common electrode (38). The first sub pixel electrode (26) and the first sub common electrode (36) have a first voltage difference and the second sub pixel electrode (28) and the second sub common electrode (38) have a second voltage difference. The first voltage difference is greater than or less than the second voltage difference.

19 Claims, 8 Drawing Sheets

(51) Int. Cl.
*G02F 1/1362* (2006.01)
*G02F 1/1335* (2006.01)

(56) References Cited

U.S. PATENT DOCUMENTS

2010/0014012 A1\* 1/2010 Irie .................. G02F 1/133707 349/39

2012/0105756 A1\* 5/2012 Chan ................. G02F 1/133707 349/42
2013/0063686 A1\* 3/2013 Tashiro ............. G02F 1/133707 349/98

FOREIGN PATENT DOCUMENTS

| CN | 102944955 A | 2/2013 |
| KR | 20070071415 A | 7/2007 |

\* cited by examiner

PIXEL STRUCTURE

BACKGROUND OF THE INVENTION

1. Field of the Invention

The present invention relates to the field of liquid crystal display technology, and in particular to a pixel structure.

2. The Related Arts

Liquid crystal displays have a variety of advantages, such as thin device body, low power consumption, and being free of radiation, and are thus widely used. Most of the liquid crystal displays that are currently available in the market are backlighting liquid crystal displays, which comprise a liquid crystal display panel and a backlight module. The operation principle of the liquid crystal display panel is that, with liquid crystal molecules interposed between two parallel glass substrates, a driving voltage is applied to the two glass substrates to control the rotation direction of the liquid crystal molecules in order to refract out light emitting from the backlight module to generate an image. Since the liquid crystal display panel does not emit light by itself, light must be provided from the backlight module in order to normally display the image. Thus, the backlight module is one of the key components of a liquid crystal display. The backlight modules can be classified in two types, namely a side-edge backlight module and a direct backlight module, according to the position where light gets incident. The direct backlight module comprises a light source, such as a cold cathode fluorescent lamp (CCFL) or a light-emitting diode (LED), which is arranged at the backside of the liquid crystal display panel to form a planar light source directly supplied to the liquid crystal display panel. The side-edge backlight module comprises an LED light bar, serving as a backlight source, which is arranged at an edge of a backplane to be located rearward of one side of the liquid crystal display panel. The LED light bar emits light that enters a light guide plate (LGP) through a light incident face at one side of the light guide plate and is projected out of a light emergence face of the light guide plate, after being reflected and diffused, to form a planar light source for the liquid crystal display panel.

The present-day liquid crystal display panels, particularly large-sized liquid crystal display panels, often show color shifting at large view angles. The larger the view angle is, the more severe the color shifting will be. In order to expand the view angle and suppress color shifting, a low color shift design that is often adopted for the large-sized liquid crystal display panels is to increase the number of domains making up of a pixel. A pixel is commonly divided into four domains and if a pixel is partitioned to two pixel zones, namely a main pixel zone and a sub pixel zone, then the number of domains is increased to eight. This increases the view angle and improves color shifting at large view angles.

Figure 1:
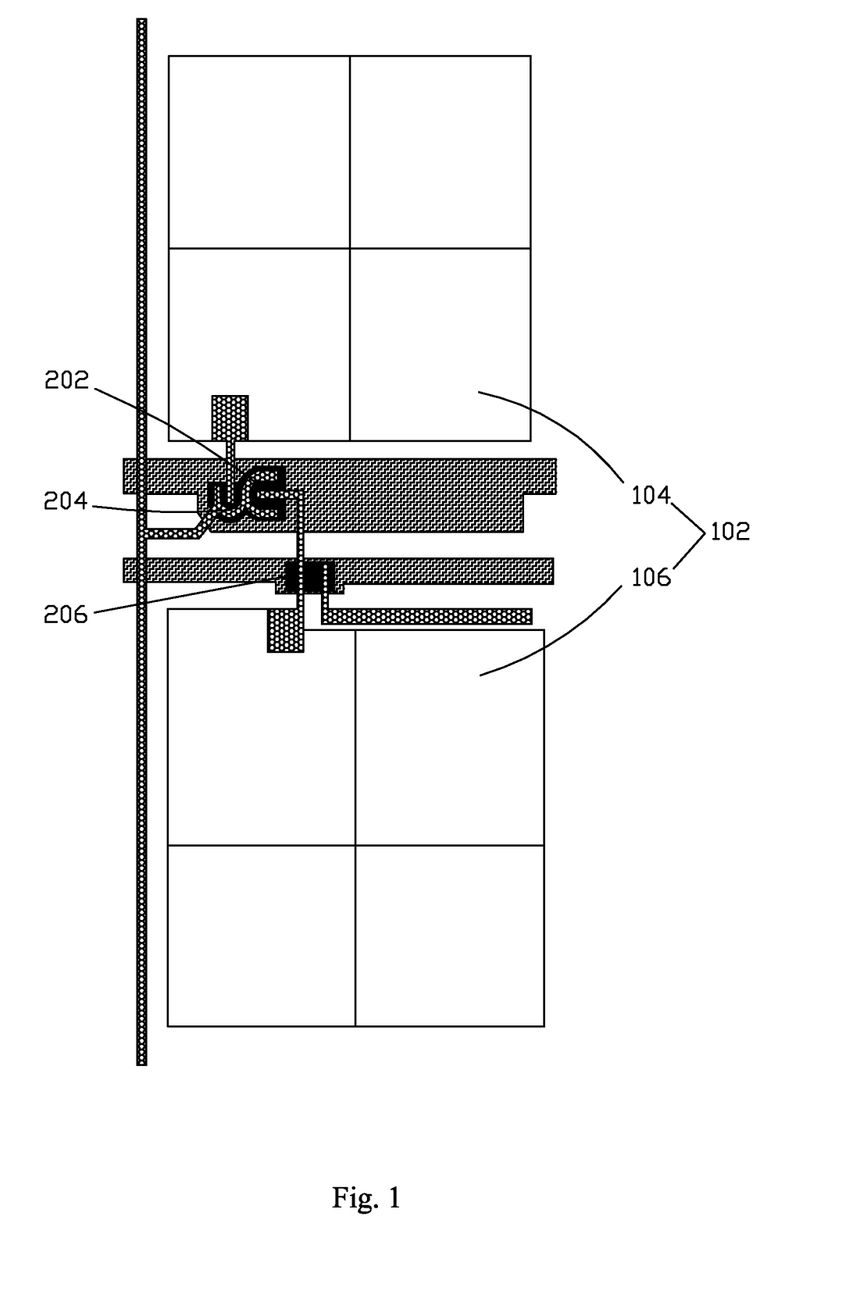
FIG. 1 is a schematic view showing a conventional pixel structure that adopts a low color shift design.
Figure 2:
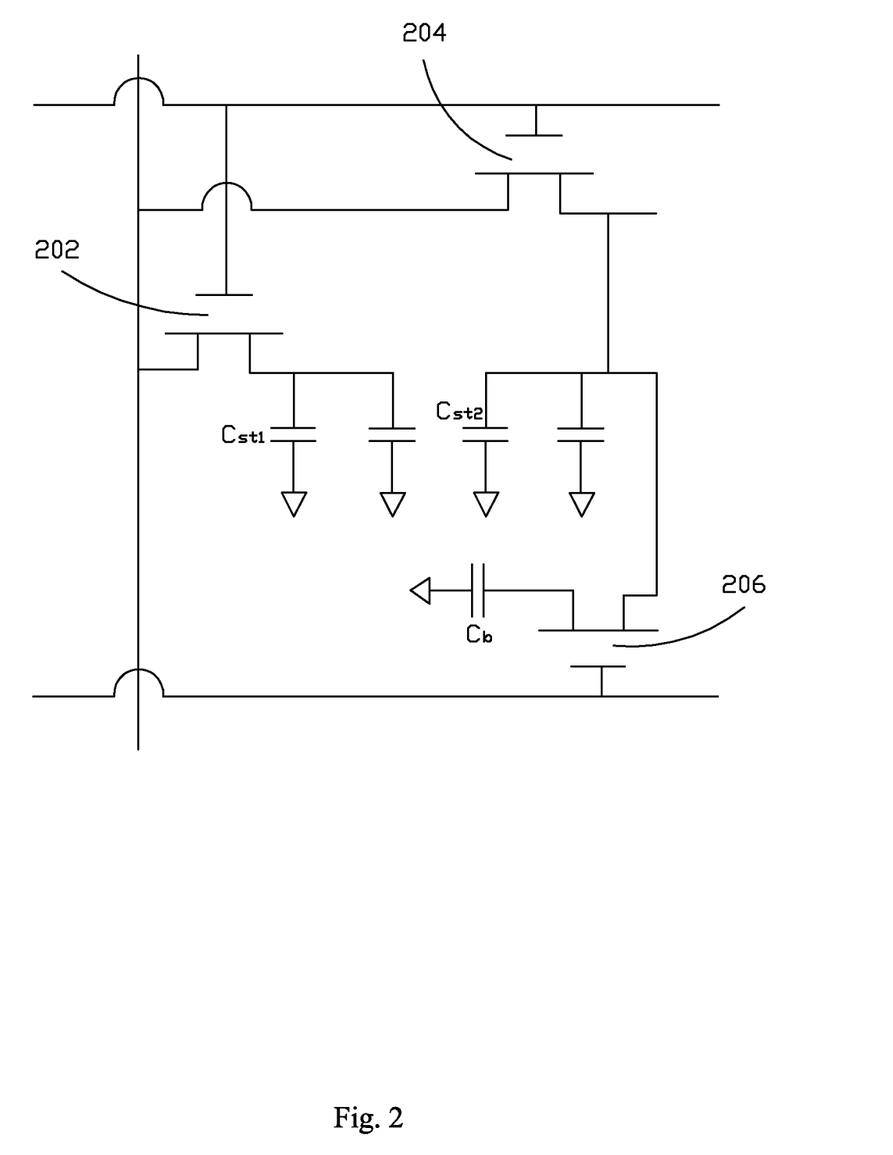
FIG. 2 is an equivalent circuit diagram of the pixel structure of FIG. 1.

The main pixel zone and the sub pixel zone are powered by means of two or more different thin-film transistors. Reference is now made to FIGS. 1 and 2, which are respectively a schematic view of a pixel structure adopting a low color shift design and an equivalent circuit diagram thereof. A pixel 102 is partitioned into a main pixel zone 104 and a sub pixel zone 106. When the gate line of number $G_n$ is activated, a first thin-film transistor (or main thin-film transistor) 202 and a second thin-film transistor (or sub thin-film transistor) 204 are respectively operated to convey electrical charges to a first storage capacitor $C_{st1}$ of the main pixel zone 104 and a second storage capacitor $C_{st2}$ of the sub pixel zone 106, which collectively constitute the pixel 102. When the gate line of number $G_n$ is de-activated and the gate line of number $G_{n+1}$ is activated, a third thin-film transistor (or charge sharing thin-film transistor) 206 is switched on to allow the electrical charges of the second storage capacitor $C_{st2}$ of the sub pixel zone 106 to partly release to a charge sharing capacitor $C_b$. This causes a differential potential between the main pixel zone 104 and the sub pixel zone 106, achieving the purposes of suppressing color shifting.

A pixel structure having such an arrangement can achieve suppressing of color shifting; however, three thin-film transistors and two gate lines are needed for each pixel to control the charging of the pixel and this causes a great loss of aperture ratio of the pixel.

SUMMARY OF THE INVENTION

An object of the present invention is to provide a pixel structure that improves the color shifting issue of a large-sized panel without reducing aperture ratio by applying voltages that supply different potentials to a first and a second sub common electrodes of a color filter substrate in order to make a first voltage difference between a first sub pixel electrode and a first sub common electrode greater than or less than a second voltage difference between a second sub pixel electrode and a second sub common electrode.

To achieve the above object, the present invention provides a pixel structure, comprising: a TFT (Thin-Film Transistor) substrate, a CF (Color Filter) substrate opposite to the TFT substrate, and a liquid crystal layer arranged between the TFT substrate and the CF substrate. The TFT substrate comprises a first transparent substrate and a pixel electrode formed on a surface of the first transparent substrate that faces the CF substrate. The CF substrate comprises a second transparent substrate and a common electrode formed on a surface of the second transparent substrate that faces the TFT substrate. The pixel electrode comprises a first sub pixel electrode and a second sub pixel electrode. The common electrode comprises a first sub common electrode and a second sub common electrode. The first sub pixel electrode and the first sub common electrode have a first voltage difference therebetween. The second sub pixel electrode and the second sub common electrode have a second voltage difference therebetween. The first voltage difference is greater than or less than the second voltage difference.

The TFT substrate further comprises a data line and a gate line arranged on the first transparent substrate. The data line and the gate line define a pixel region. The pixel region comprises a first and a second sub pixel zones. The first sub pixel electrode is located in the first sub pixel zone. The second sub pixel electrode is located in the second sub pixel zone. The pixel structure further comprises: a first storage capacitor that is formed between the first transparent substrate and the second transparent substrate and, after being charged, supplies a constant driving voltage to the first sub pixel zone and a second storage capacitor that is formed between the first transparent substrate and the second transparent substrate and, after being charged, supplies a constant driving voltage to the second sub pixel zone. The first sub pixel electrode and the first sub common electrode constitute a first liquid crystal capacitor of the first sub pixel zone. The second sub pixel electrode and the second sub common electrode constitute a second liquid crystal capacitor of the second sub pixel zone.

The TFT substrate further comprises a first TFT and a second TFT formed on the first transparent substrate. The first TFT comprises a first gate terminal, a first source terminal, and a first drain terminal. The second TFT comprises a second gate terminal, a second source terminal, and a second drain terminal. The first gate terminal is electrically connected to the gate line. The first source terminal is electrically connected to the data line. The first drain terminal is electrically connected to the first sub pixel electrode and the first storage capacitor. The second gate terminal is electrically connected to the gate line. The second source terminal is electrically connected to the data line. The second drain terminal is electrically connected to the second sub pixel electrode and the second storage capacitor.

The first and second sub common electrodes are formed by means of film forming processes, photoresist coating processes, exposure processes, development processes, and etching processes and the first and second sub pixel electrodes are formed by means of film forming processes, photoresist coating processes, exposure processes, development processes, and etching processes.

The first sub common electrode is of a comb-shape and the first sub common electrode comprises: a first comb stem and multiple first comb teeth each having an end connected to the first comb stem; the second sub common electrode is of a comb shape and the second sub common electrode comprises: a second comb stem and multiple second comb teeth each having an end connected to the second comb stem, the first comb teeth and the second comb teeth being arranged to alternate each other.

Driving voltages applied to the first sub pixel electrode and the first sub common electrode are rectangular alternate currents and driving voltages applied to the second sub pixel electrode and the second sub common electrode are rectangular alternate currents.

When the driving voltages are applied to the first and second sub common electrodes, the first sub common electrode and the second sub common electrode have different potentials to achieve the first voltage difference being greater than or less than the second voltage difference.

The pixel structure comprises a eight-domain configuration, in which the first sub pixel zone represents four of the eight domains and the second sub pixel zone represents the remaining four of the eight domains.

The first transparent substrate is a glass substrate or a plastic substrate and the second transparent substrate is a glass substrate or a plastic substrate.

The TFT substrate further comprises a third TFT formed on the first transparent substrate and the third TFT comprises a third gate terminal, a third source terminal, and a third drain terminal. The third gate terminal is electrically connected to the gate line. The third source terminal is electrically connected to the data line. The third drain terminal is electrically connected to the first sub pixel electrode, the second sub pixel electrode, the first storage capacitor, and the second storage capacitor.

The present invention also provides a pixel structure, which comprises: a TFT (Thin-Film Transistor) substrate, a CF (Color Filter) substrate opposite to the TFT substrate, and a liquid crystal layer arranged between the TFT substrate and the CF substrate, the TFT substrate comprising a first transparent substrate and a pixel electrode formed on a surface of the first transparent substrate that faces the CF substrate, the CF substrate comprising a second transparent substrate and a common electrode formed on a surface of the second transparent substrate that faces the TFT substrate, the pixel electrode comprising a first sub pixel electrode and a second sub pixel electrode, the common electrode comprising a first sub common electrode and a second sub common electrode, the first sub pixel electrode and the first sub common electrode having a first voltage difference therebetween, the second sub pixel electrode and the second sub common electrode having a second voltage difference therebetween, the first voltage difference being greater than or less than the second voltage difference;

wherein the TFT substrate further comprises a data line and a gate line arranged on the first transparent substrate, the data line and the gate line defining a pixel region, the pixel region comprising a first and a second sub pixel zones, the first sub pixel electrode being located in the first sub pixel zone, the second sub pixel electrode being located in the second sub pixel zone, the pixel structure further comprising: a first storage capacitor that is formed between the first transparent substrate and the second transparent substrate and, after being charged, supplies a constant driving voltage to the first sub pixel zone and a second storage capacitor that is formed between the first transparent substrate and the second transparent substrate and, after being charged, supplies a constant driving voltage to the second sub pixel zone, the first sub pixel electrode and the first sub common electrode constituting a first liquid crystal capacitor of the first sub pixel zone, the second sub pixel electrode and the second sub common electrode constituting a second liquid crystal capacitor of the second sub pixel zone;

wherein the TFT substrate further comprises a first TFT and a second TFT formed on the first transparent substrate, the first TFT comprising a first gate terminal, a first source terminal, and a first drain terminal, the second TFT comprising a second gate terminal, a second source terminal, and a second drain terminal, the first gate terminal being electrically connected to the gate line, the first source terminal being electrically connected to the data line, the first drain terminal being electrically connected to the first sub pixel electrode and the first storage capacitor, the second gate terminal being electrically connected to the gate line, the second source terminal being electrically connected to the data line, the second drain terminal being electrically connected to the second sub pixel electrode and the second storage capacitor;

wherein the first and second sub common electrodes are formed by means of film forming processes, photoresist coating processes, exposure processes, development processes, and etching processes and the first and second sub pixel electrodes are formed by means of film forming processes, photoresist coating processes, exposure processes, development processes, and etching processes;

wherein the first sub common electrode is of a comb-shape and the first sub common electrode comprises: a first comb stem and multiple first comb teeth each having an end connected to the first comb stem; the second sub common electrode is of a comb shape and the second sub common electrode comprises: a second comb stem and multiple second comb teeth each having an end connected to the second comb stem, the first comb teeth and the second comb teeth being arranged to alternate each other; and wherein driving voltages applied to the first sub pixel electrode and the first sub common electrode are rectangular alternate currents and driving voltages applied to the second sub pixel electrode and the second sub common electrode are rectangular alternate currents.

When the driving voltages are applied to the first and second sub common electrodes, the first sub common electrode and the second sub common electrode have different potentials to achieve the first voltage difference being greater than or less than the second voltage difference.

The pixel structure comprises a eight-domain configuration, in which the first sub pixel zone represents four of the eight domains and the second sub pixel zone represents the remaining four of the eight domains.

The first transparent substrate is a glass substrate or a plastic substrate and the second transparent substrate is a glass substrate or a plastic substrate.

The efficacy of the present invention is that the present invention provides a pixel structure, in which voltages of different potentials are respectively applied to first and second sub common electrodes of a color filter substrate so as to make a first voltage difference between a first sub pixel electrode and the first sub common electrode greater than or less than a second voltage difference between a second sub pixel electrode and the second sub common electrode, whereby the need for an additional gate line and formation of a charge sharing capacitor on the pixel electrode side that are found in the prior art can be avoided and further, it is possible to reduce one or two thin-film transistors to avoid loss of aperture ratio so as to improve the color shift problem of large view angles of a large-sized panel without reducing the aperture ratio.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to preferred embodiments of the present invention and the attached drawings.

Referring to FIGS. 3-8, the present invention provides a pixel structure 10, which comprises: a TFT (Thin-Film Transistor) substrate 20, a CF (Color Filter) substrate 30 opposite to the TFT substrate 20, and a liquid crystal layer 40 arranged between the TFT substrate 20 and the CF substrate 30.

Figure 3:
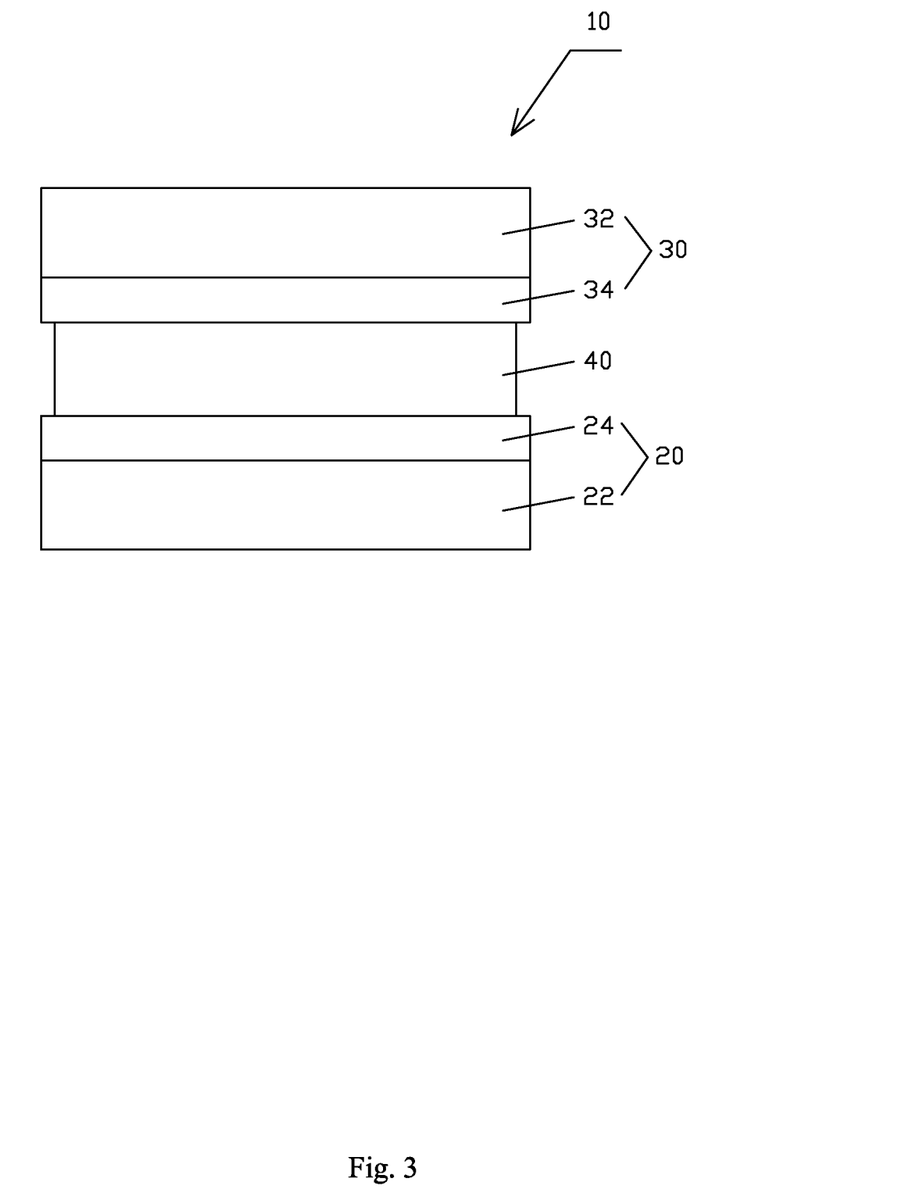
FIG. 3 is a schematic view showing a pixel structure according to the present invention.

The TFT substrate 20 comprises a first transparent substrate 22 and a pixel electrode 24 formed on a surface of the first transparent substrate 22 that faces the CF substrate 30. The CF substrate 30 comprises a second transparent substrate 32 and a common electrode 34 formed on a surface of the second transparent substrate 32 that faces the TFT substrate 20. The pixel electrode 24 comprises a first sub pixel electrode 26 and a second sub pixel electrode 28. The common electrode 34 comprises a first sub common electrode 36 and a second sub common electrode 38. The first sub pixel electrode 26 and the first sub common electrode 36 have a first voltage difference U1 therebetween and the second sub pixel electrode 28 and the second sub common electrode 38 have a second voltage difference U2 therebetween. The first voltage difference U1 is greater than or less than the second voltage difference U2. With such an arrangement, the need for an additional gate line and formation of a charge sharing capacitor on the pixel electrode side that are found in the prior art can be avoided and further, it is possible to reduce one or two thin-film transistors to avoid loss of aperture ratio so as to improve the color shift problem of large view angles of a large-sized panel without reducing the aperture ratio.

Figure 4:
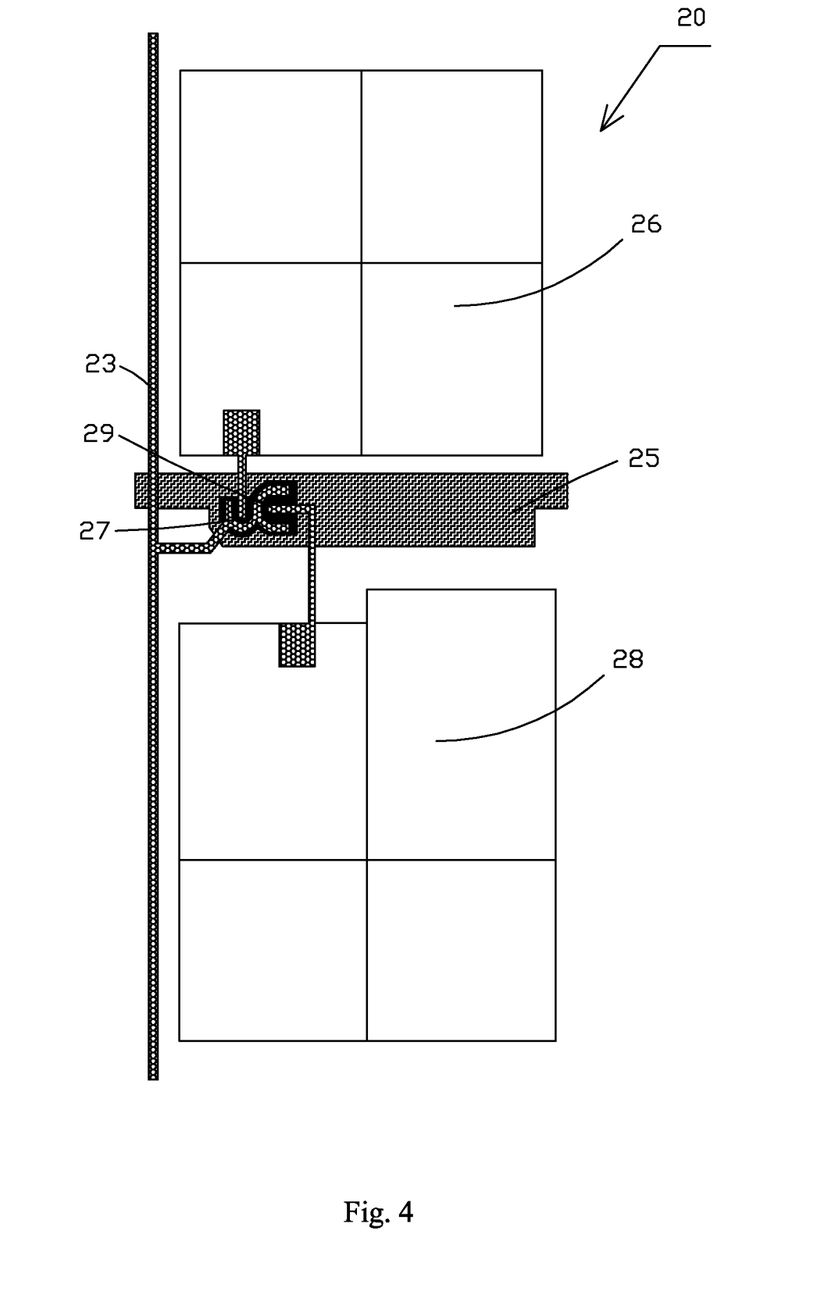
FIG. 4 is a top plan view of an embodiment of the pixel structure according to the present invention.

Specifically, the TFT substrate 20 further comprises a data line 23 and a gate line 25 arranged on the first transparent substrate 22 to supply a scan signal and a data signal. The data line 23 and the gate line 25 define a pixel region (not labeled). The pixel region comprises a first and a second sub pixel zones. The first sub pixel electrode 26 is located in the first sub pixel zone and the second sub pixel electrode 28 is located in the second sub pixel zone. The pixel structure 10 further comprises: a first storage capacitor C1 that is formed between the first transparent substrate 22 and the second transparent substrate 32 and, after being charged, supplies a constant driving voltage to the first sub pixel zone and a second storage capacitor C2 that is formed between the first transparent substrate 22 and the second transparent substrate 32 and, after being charged, supplies a constant driving voltage to the second sub pixel zone. The first sub pixel electrode 26 and the first sub common electrode 36 constitute a first liquid crystal capacitor C3 of the first sub pixel zone and the second sub pixel electrode 28 and the second sub common electrode 38 constitute a second liquid crystal capacitor C4 of the second sub pixel zone.

Figure 5:
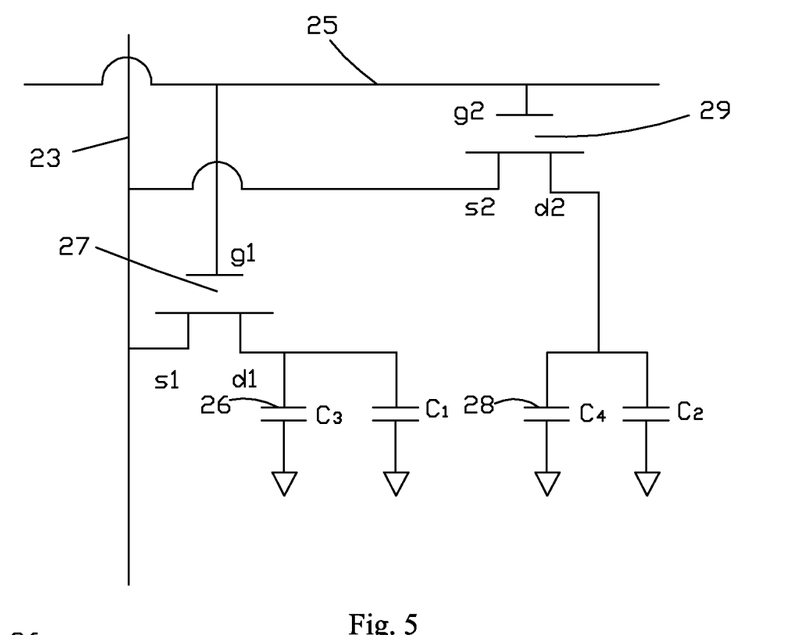
FIG. 5 is an equivalent circuit diagram of the pixel structure shown in FIG. 4.

Referring additionally to FIG. 5, in the instant preferred embodiment, the TFT substrate 20 may further comprise a first TFT 27 and a second TFT 29 formed on the first transparent substrate 22. The first TFT 27 comprises a first gate terminal g1, a first source terminal s1, and a first drain terminal d1. The second TFT 29 comprises a second gate terminal g2, a second source terminal s2, and a second drain terminal d2. The first gate terminal g1 is electrically connected to the gate line 25. The first source terminal s1 is electrically connected to the data line 23. The first drain terminal d1 is electrically connected to the first sub pixel electrode 26 and the first storage capacitor C1. The second gate terminal g2 is electrically connected to the gate line 25. The second source terminal s2 is electrically connected to the data line 23. The second drain terminal d2 is electrically connected to the second sub pixel electrode 28 and the second storage capacitor C2. The first and second storage capacitors C1, C2, after being charged, function to supply driving voltages to maintain an image of the first and second sub pixel zones within a frame. The instant embodiment uses only two thin-film transistors 27, 29, one gate line 25, and one data line 23, making it useful in maintaining the aperture ratio, so as to achieve low color shift in large view angles without reducing the aperture ratio.

The first and second sub common electrodes 36, 38 are both formed by means of film forming processes, photoresist coating processes, exposure processes, development processes, and etching processes and are preferably made of indium tin oxide. The first and second sub pixel electrodes 26, 28 are both formed by means of film forming processes, photoresist coating processes, exposure processes, development processes, and etching processes and are preferably made of indium tin oxide.

Figure 6:
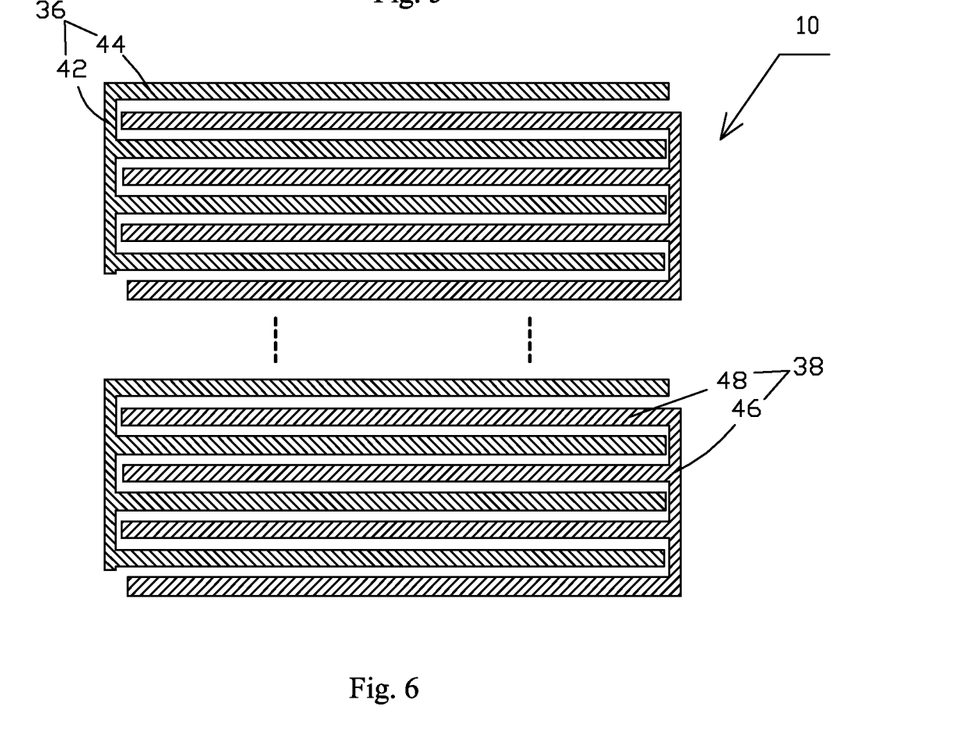
FIG. 6 is a schematic view showing the structure of a first sub common electrode and a second sub common electrode of the pixel structure according to the present invention.

Referring to FIG. 6, the first sub common electrode 36 is of a comb-shape and the first sub common electrode 36 comprises: a first comb stem 42 and multiple first comb teeth 44 each having an end connected to the first comb stem 42. The second sub common electrode 38 is of a comb shape and the second sub common electrode 38 comprises: a second comb stem 46 and multiple second comb teeth 48 each having an end connected to the second comb stem 46. The first comb teeth 44 and the second comb teeth 48 are arranged to alternate each other.

Figure 7:
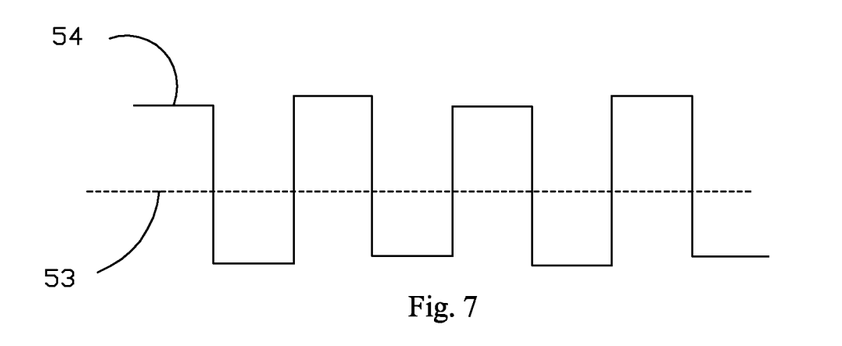
FIG. 7 shows a waveform of a voltage applied to a first sub pixel electrode and the first sub common electrode of the pixel structure according to the present invention.
Figure 8:
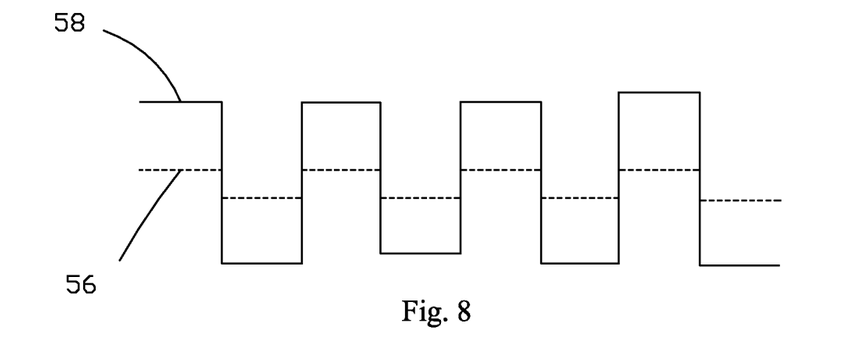
FIG. 8 shows a waveform of a voltage applied to a second sub pixel electrode and the second sub common electrode of the pixel structure according to the present invention.

Referring to FIGS. 7 and 8, the driving voltages applied to the first sub pixel electrode 26 and the first sub common electrode 36 are rectangular alternate currents 53, 54 and the driving voltages applied to the second sub pixel electrode 28 and the second sub common electrode 38 are rectangular alternate currents 56, 58. In the present invention, when the driving voltages are respectively applied through conductive golden balls to the first and second sub common electrodes 36, 38, the first sub common electrode 36 and the second sub common electrode 38 have different potentials and the first and second sub pixel electrodes 26, 28 have the same potential so as to achieve the first voltage difference being greater than or less than the second voltage difference for improving the color shift issue of a large-sized liquid crystal panel at a large view angle.

The pixel structure 10 adopts an 8-domain arrangement. In other words, there are 8 orientations of liquid crystal in a single pixel structure 10 in order to achieve large view angle. The first sub pixel zone represents four domains among the eight domains, while the second sub pixel zone represents the other four domains of the eight domains, as shown in FIG. 4.

The first transparent substrate 22 is a glass substrate or a plastic substrate and the second transparent substrate 32 is a glass substrate or a plastic substrate.

Figure 9:
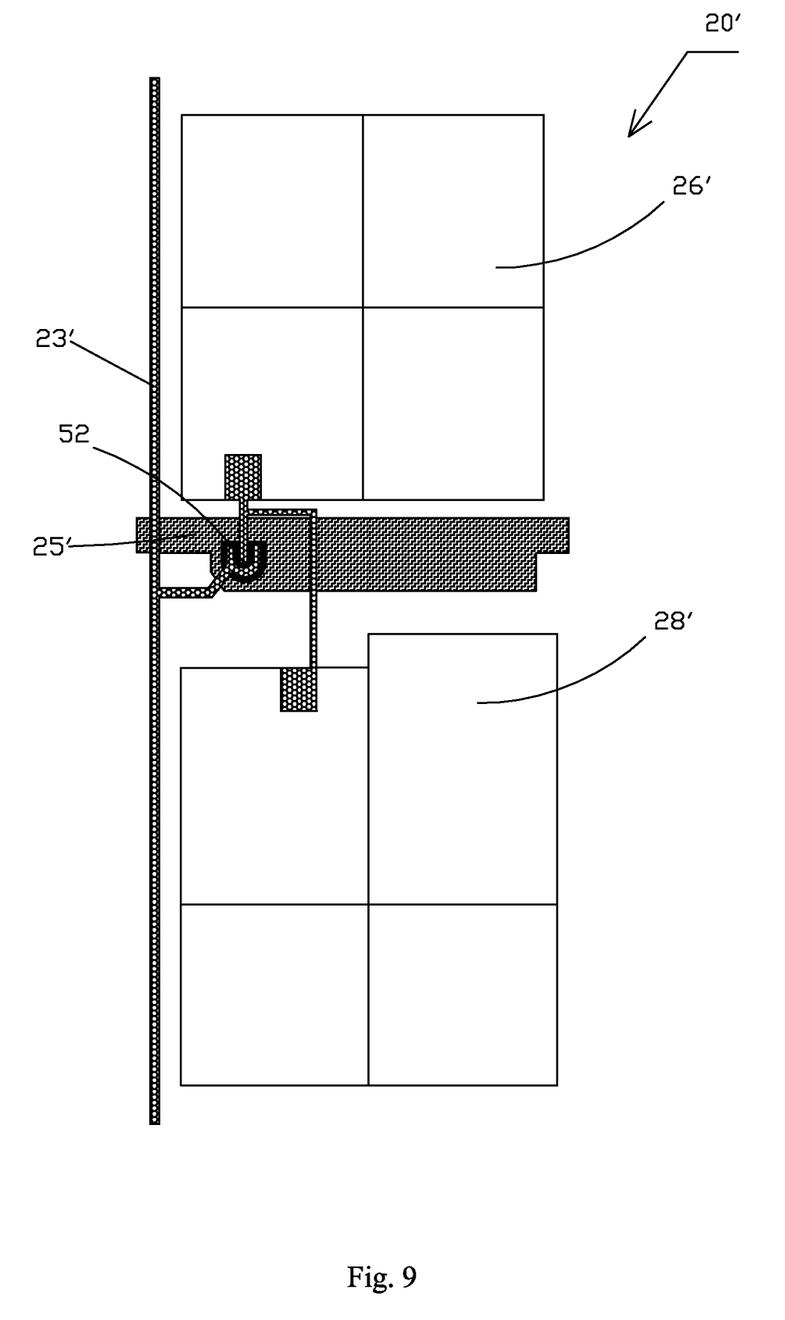
FIG. 9 is a top plan view of another embodiment of the pixel structure according to the present invention.
Figure 10:
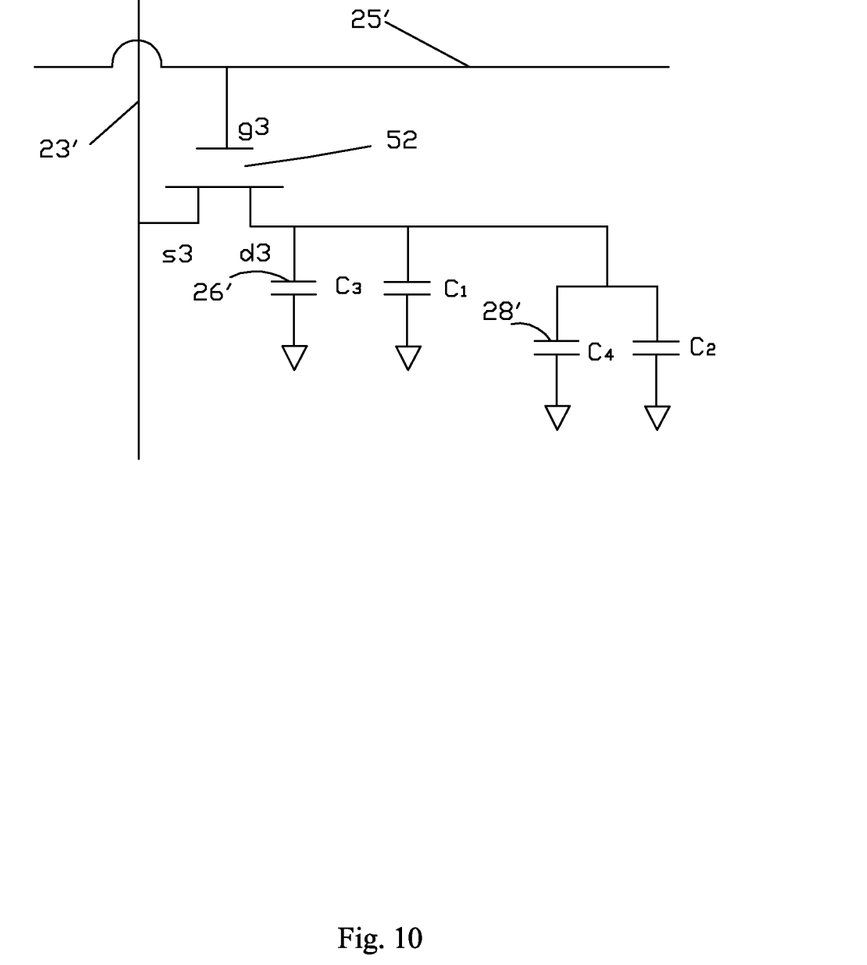
FIG. 10 is an equivalent circuit diagram of the pixel structure shown in FIG. 9.

Referring to FIGS. 9 and 10, as an alternative preferred embodiment, the TFT substrate 20' comprises only one thin-film transistor, namely the third TFT 52 shown in FIGS. 9 and 10. Using the third TFT 52 to simultaneously drive the first sub pixel electrode 26' and the second sub pixel electrode 28' makes the structure simple and is advantageous for increasing the aperture ratio. The third TFT 52 comprises a third gate terminal g3, a third source terminal s3, and a third drain terminal d3. The third gate terminal g3 is electrically connected to the gate line 25'. The third source terminal s3 is electrically connected to the data line 25'. The third drain terminal d3 is electrically connected to the first sub pixel electrode 26', the second sub pixel electrode 28', the first storage capacitor C1, and the second storage capacitor C2. The remaining structure of this embodiment is identical to that of the previous embodiment.

In summary, the present invention provides a pixel structure, in which voltages of different potentials are respectively applied to first and second sub common electrodes of a color filter substrate so as to make a first voltage difference between a first sub pixel electrode and the first sub common electrode greater than or less than a second voltage difference between a second sub pixel electrode and the second sub common electrode, whereby the need for an additional gate line and formation of a charge sharing capacitor on the pixel electrode side that are found in the prior art can be avoided and further, it is possible to reduce one or two thin-film transistors to avoid loss of aperture ratio so as to improve the color shift problem of large view angles of a large-sized panel without reducing the aperture ratio.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A pixel structure, comprising: a TFT (Thin-Film Transistor) substrate, a CF (Color Filter) substrate opposite to the TFT substrate, and a liquid crystal layer arranged between the TFT substrate and the CF substrate, the TFT substrate comprising a first transparent substrate and a pixel electrode formed on a surface of the first transparent substrate that faces the CF substrate, the CF substrate comprising a second transparent substrate and a common electrode formed on a surface of the second transparent substrate that faces the TFT substrate, the pixel electrode comprising a first sub pixel electrode and a second sub pixel electrode, the common electrode comprising a first sub common electrode and a second sub common electrode, the first sub pixel electrode and the first sub common electrode having a first voltage difference therebetween, the second sub pixel electrode and the second sub common electrode having a second voltage difference therebetween, the first voltage difference being greater than or less than the second voltage difference;

wherein the first sub common electrode is of a comb-shape and the first sub common electrode comprises: a first comb stem and multiple first comb teeth each having an end connected to the first comb stem; the second sub common electrode is of a comb shape and the second sub common electrode comprises: a second comb stem and multiple second comb teeth each having an end connected to the second comb stem, the first comb teeth and the second comb teeth being arranged to alternate each other.

2. The pixel structure as claimed in claim 1, wherein the TFT substrate further comprises a data line and a gate line arranged on the first transparent substrate, the data line and the gate line defining a pixel region, the pixel region comprising a first and a second sub pixel zones, the first sub pixel electrode being located in the first sub pixel zone, the second sub pixel electrode being located in the second sub pixel zone, the pixel structure further comprising: a first storage capacitor that is formed between the first transparent substrate and the second transparent substrate and, after being charged, supplies a constant driving voltage to the first sub pixel zone and a second storage capacitor that is formed between the first transparent substrate and the second transparent substrate and, after being charged, supplies a constant driving voltage to the second sub pixel zone, the first sub pixel electrode and the first sub common electrode constituting a first liquid crystal capacitor of the first sub pixel zone, the second sub pixel electrode and the second sub common electrode constituting a second liquid crystal capacitor of the second sub pixel zone.

3. The pixel structure as claimed in claim 2, wherein the TFT substrate further comprises a first TFT and a second TFT formed on the first transparent substrate, the first TFT comprising a first gate terminal, a first source terminal, and a first drain terminal, the second TFT comprising a second gate terminal, a second source terminal, and a second drain terminal, the first gate terminal being electrically connected to the gate line, the first source terminal being electrically connected to the data line, the first drain terminal being electrically connected to the first sub pixel electrode and the first storage capacitor, the second gate terminal being electrically connected to the gate line, the second source terminal being electrically connected to the data line, the second drain terminal being electrically connected to the second sub pixel electrode and the second storage capacitor.

4. The pixel structure as claimed in claim 2, wherein the pixel structure comprises an eight-domain configuration, in which the first sub pixel zone represents four of the eight domains and the second sub pixel zone represents the remaining four of the eight domains. the second storage capacitor.

5. The pixel structure as claimed in claim 2, wherein the TFT substrate further comprises a third TFT formed on the first transparent substrate and the third TFT comprises a third gate terminal, a third source terminal, and a third drain terminal, the third gate terminal being electrically connected to the gate line, the third source terminal being electrically connected to the data line, the third drain terminal being electrically connected to the first sub pixel electrode, the second sub pixel electrode, the first storage capacitor, and the second storage capacitor.

6. The pixel structure as claimed in claim 1, wherein the first and second sub common electrodes are formed by means of film forming processes, photoresist coating processes, exposure processes, development processes, and etching processes and the first and second sub pixel electrodes are formed by means of film forming processes, photoresist coating processes, exposure processes, development processes, and etching processes.

7. The pixel structure as claimed in claim 1, wherein driving voltages applied to the first sub pixel electrode and the first sub common electrode are rectangular alternate currents and driving voltages applied to the second sub pixel electrode and the second sub common electrode are rectangular alternate currents.

8. The pixel structure as claimed in claim 7, wherein when the driving voltages are applied to the first and second sub common electrodes, the first sub common electrode and the second sub common electrode have different potentials to achieve the first voltage difference being greater than or less than the second voltage difference.

9. The pixel structure as claimed in claim 1, wherein the first transparent substrate is a glass substrate or a plastic substrate and the second transparent substrate is a glass substrate or a plastic substrate.

10. A pixel structure, comprising: a TFT (Thin-Film Transistor) substrate, a CF (Color Filter) substrate opposite to the TFT substrate, and a liquid crystal layer arranged between the TFT substrate and the CF substrate, the TFT substrate comprising a first transparent substrate and a pixel electrode formed on a surface of the first transparent substrate that faces the CF substrate, the CF substrate comprising a second transparent substrate and a common electrode formed on a surface of the second transparent substrate that faces the TFT substrate, the pixel electrode comprising a first sub pixel electrode and a second sub pixel electrode, the common electrode comprising a first sub common electrode and a second sub common electrode, the first sub pixel electrode and the first sub common electrode having a first voltage difference therebetween, the second sub pixel electrode and the second sub common electrode having a second voltage difference therebetween, the first voltage difference being greater than or less than the second voltage difference;

wherein the TFT substrate further comprises a data line and a gate line arranged on the first transparent substrate, the data line and the gate line defining a pixel region, the pixel region comprising a first and a second sub pixel zones, the first sub pixel electrode being located in the first sub pixel zone, the second sub pixel electrode being located in the second sub pixel zone, the pixel structure further comprising: a first storage capacitor that is formed between the first transparent substrate and the second transparent substrate and, after being charged, supplies a constant driving voltage to the first sub pixel zone and a second storage capacitor that is formed between the first transparent substrate and the second transparent substrate and, after being charged, supplies a constant driving voltage to the second sub pixel zone, the first sub pixel electrode and the first sub common electrode constituting a first liquid crystal capacitor of the first sub pixel zone, the second sub pixel electrode and the second sub common electrode constituting a second liquid crystal capacitor of the second sub pixel zone;

wherein the TFT substrate further comprises a first TFT and a second TFT formed on the first transparent substrate, the first TFT comprising a first gate terminal, a first source terminal, and a first drain terminal, the second TFT comprising a second gate terminal, a second source terminal, and a second drain terminal, the first gate terminal being electrically connected to the gate line, the first source terminal being electrically connected to the data line, the first drain terminal being electrically connected to the first sub pixel electrode and the first storage capacitor, the second gate terminal being electrically connected to the gate line, the second source terminal being electrically connected to the data line, the second drain terminal being electrically connected to the second sub pixel electrode and the second storage capacitor;

wherein the first and second sub common electrodes are formed by means of film forming processes, photoresist coating processes, exposure processes, development processes, and etching processes and the first and second sub pixel electrodes are formed by means of film forming processes, photoresist coating processes, exposure processes, development processes, and etching processes;

wherein the first sub common electrode is of a comb-shape and the first sub common electrode comprises: a first comb stem and multiple first comb teeth each having an end connected to the first comb stem; the second sub common electrode is of a comb shape and the second sub common electrode comprises: a second comb stem and multiple second comb teeth each having an end connected to the second comb stem, the first comb teeth and the second comb teeth being arranged to alternate each other; and wherein driving voltages applied to the first sub pixel electrode and the first sub common electrode are rectangular alternate currents and driving voltages applied to the second sub pixel electrode and the second sub common electrode are rectangular alternate currents.

11. The pixel structure as claimed in claim 10, wherein when the driving voltages are applied to the first and second sub common electrodes, the first sub common electrode and the second sub common electrode have different potentials to achieve the first voltage difference being greater than or less than the second voltage difference.

12. The pixel structure as claimed in claim 10, wherein the pixel structure comprises a eight-domain configuration, in which the first sub pixel zone represents four of the eight domains and the second sub pixel zone represents the remaining four of the eight domains.

13. The pixel structure as claimed in claim 10, wherein the first transparent substrate is a glass substrate or a plastic substrate and the second transparent substrate is a glass substrate or a plastic substrate.

14. A pixel structure, comprising: a TFT (Thin-Film Transistor) substrate, a CF (Color Filter) substrate opposite to the TFT substrate, and a liquid crystal layer arranged between the TFT substrate and the CF substrate, the TFT substrate comprising a first transparent substrate and a pixel electrode formed on a surface of the first transparent substrate that faces the CF substrate, the CF substrate comprising a second transparent substrate and a common electrode formed on a surface of the second transparent substrate that faces the TFT substrate, the pixel electrode comprising a first sub pixel electrode and a second sub pixel electrode, the common electrode comprising a first sub common electrode and a second sub common electrode, the first sub pixel electrode and the first sub common electrode having a first voltage difference therebetween, the second sub pixel electrode and the second sub common electrode having a second voltage difference therebetween, the first voltage difference being greater than or less than the second voltage difference;

wherein driving voltages applied to the first sub pixel electrode and the first sub common electrode are rectangular alternate currents and driving voltages applied to the second sub pixel electrode and the second sub common electrode are rectangular alternate currents; and wherein when the driving voltages are applied to the first and second sub common electrodes, the first sub common electrode and the second sub common electrode have different potentials to achieve the first voltage difference being greater than or less than the second voltage difference.

15. The pixel structure as claimed in claim 14, wherein the TFT substrate further comprises a data line and a gate line arranged on the first transparent substrate, the data line and the gate line defining a pixel region, the pixel region comprising a first and a second sub pixel zones, the first sub pixel electrode being located in the first sub pixel zone, the second sub pixel electrode being located in the second sub pixel zone, the pixel structure further comprising: a first storage capacitor that is formed between the first transparent substrate and the second transparent substrate and, after being charged, supplies a constant driving voltage to the first sub pixel zone and a second storage capacitor that is formed between the first transparent substrate and the second transparent substrate and, after being charged, supplies a constant driving voltage to the second sub pixel zone, the first sub pixel electrode and the first sub common electrode constituting a first liquid crystal capacitor of the first sub pixel zone, the second sub pixel electrode and the second sub common electrode constituting a second liquid crystal capacitor of the second sub pixel zone.

16. The pixel structure as claimed in claim 15, wherein the TFT substrate further comprises a first TFT and a second TFT formed on the first transparent substrate, the first TFT comprising a first gate terminal, a first source terminal, and a first drain terminal, the second TFT comprising a second gate terminal, a second source terminal, and a second drain terminal, the first gate terminal being electrically connected to the gate line, the first source terminal being electrically connected to the data line, the first drain terminal being electrically connected to the first sub pixel electrode and the first storage capacitor, the second gate terminal being electrically connected to the gate line, the second source terminal being electrically connected to the data line, the second drain terminal being electrically connected to the second sub pixel electrode and the second storage capacitor.

17. The pixel structure as claimed in claim 15, wherein the TFT substrate further comprises a third TFT formed on the first transparent substrate and the third TFT comprises a third gate terminal, a third source terminal, and a third drain terminal, the third gate terminal being electrically connected to the gate line, the third source terminal being electrically connected to the data line, the third drain terminal being electrically connected to the first sub pixel electrode, the second sub pixel electrode, the first storage capacitor, and the second storage capacitor.

18. The pixel structure as claimed in claim 14, wherein the first and second sub common electrodes are formed by means of film forming processes, photoresist coating processes, exposure processes, development processes, and etching processes and the first and second sub pixel electrodes are formed by means of film forming processes, photoresist coating processes, exposure processes, development processes, and etching processes.

19. The pixel structure as claimed in claim 14, wherein the first transparent substrate is a glass substrate or a plastic substrate and the second transparent substrate is a glass substrate or a plastic substrate.

* * * * *